Figure 1:
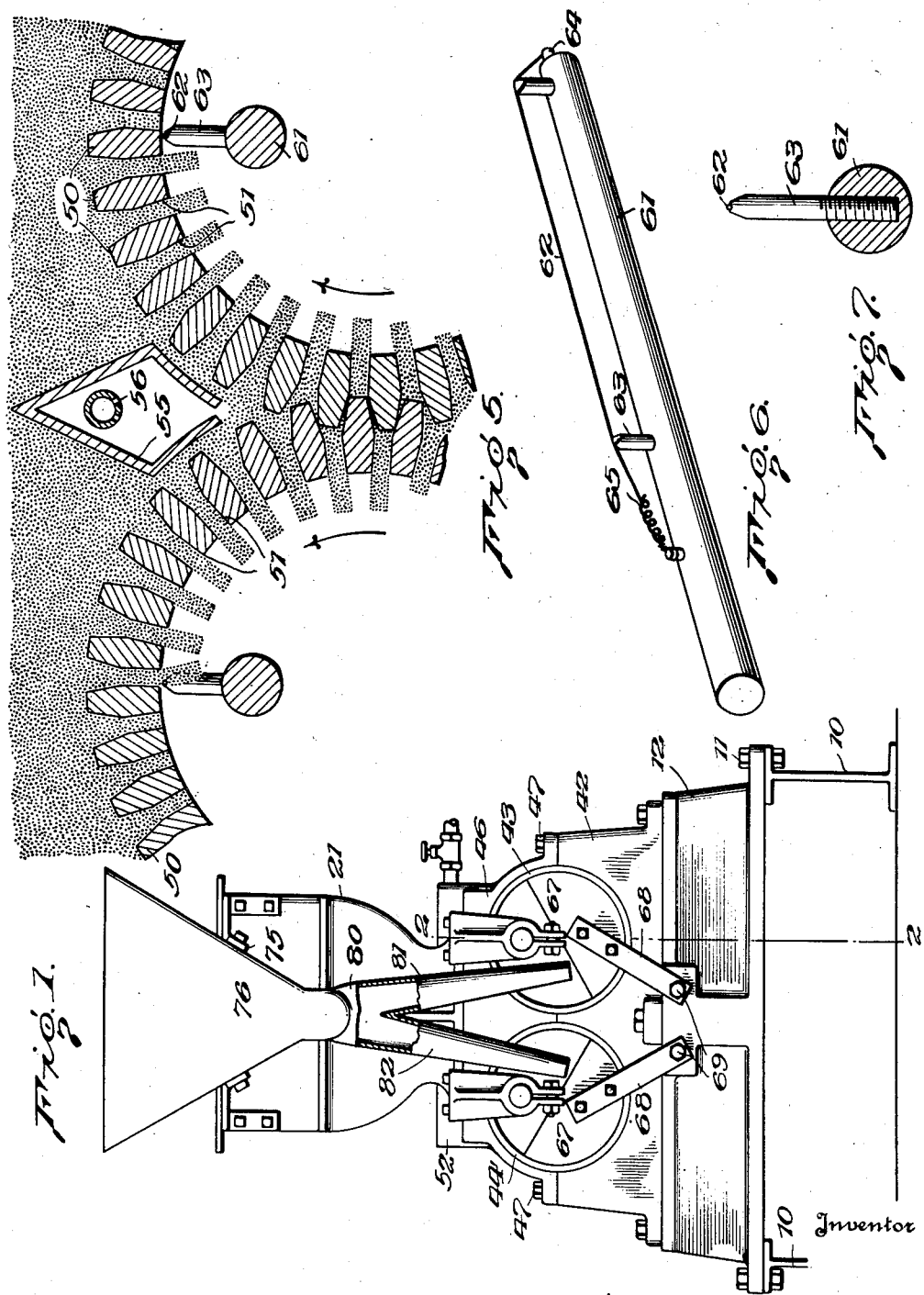

Oct. 16, 1934.　　　　J. H. THOMPSON　　　　1,977,099
APPARATUS FOR FORMING NODULES AND THE LIKE
Filed Dec. 21, 1931　　5 Sheets-Sheet 1

Oct. 16, 1934.  J. H. THOMPSON  1,977,099
APPARATUS FOR FORMING NODULES AND THE LIKE
Filed Dec. 21, 1931  5 Sheets-Sheet 2

Inventor
John H. Thompson
By Richard K. Stevens
Attorney

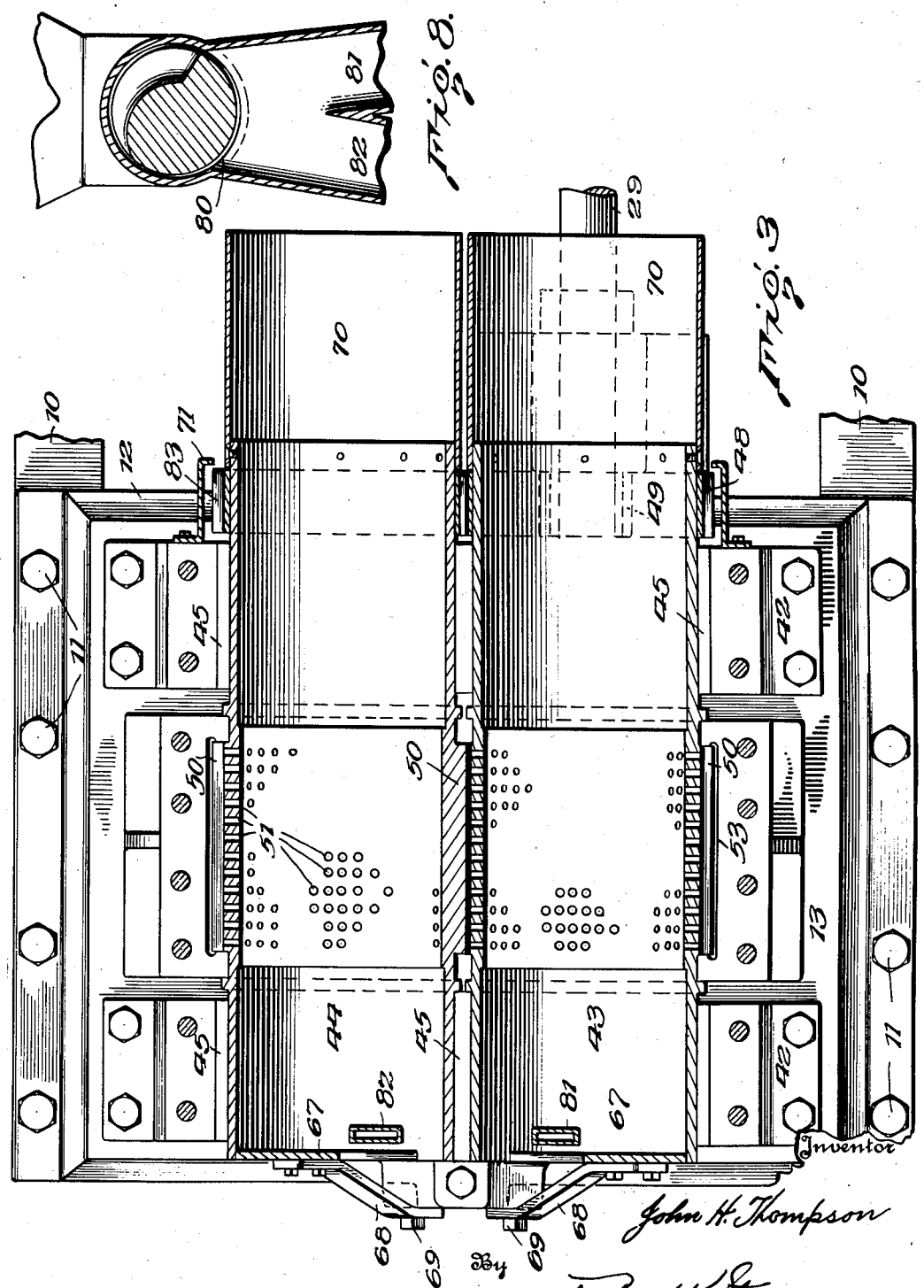

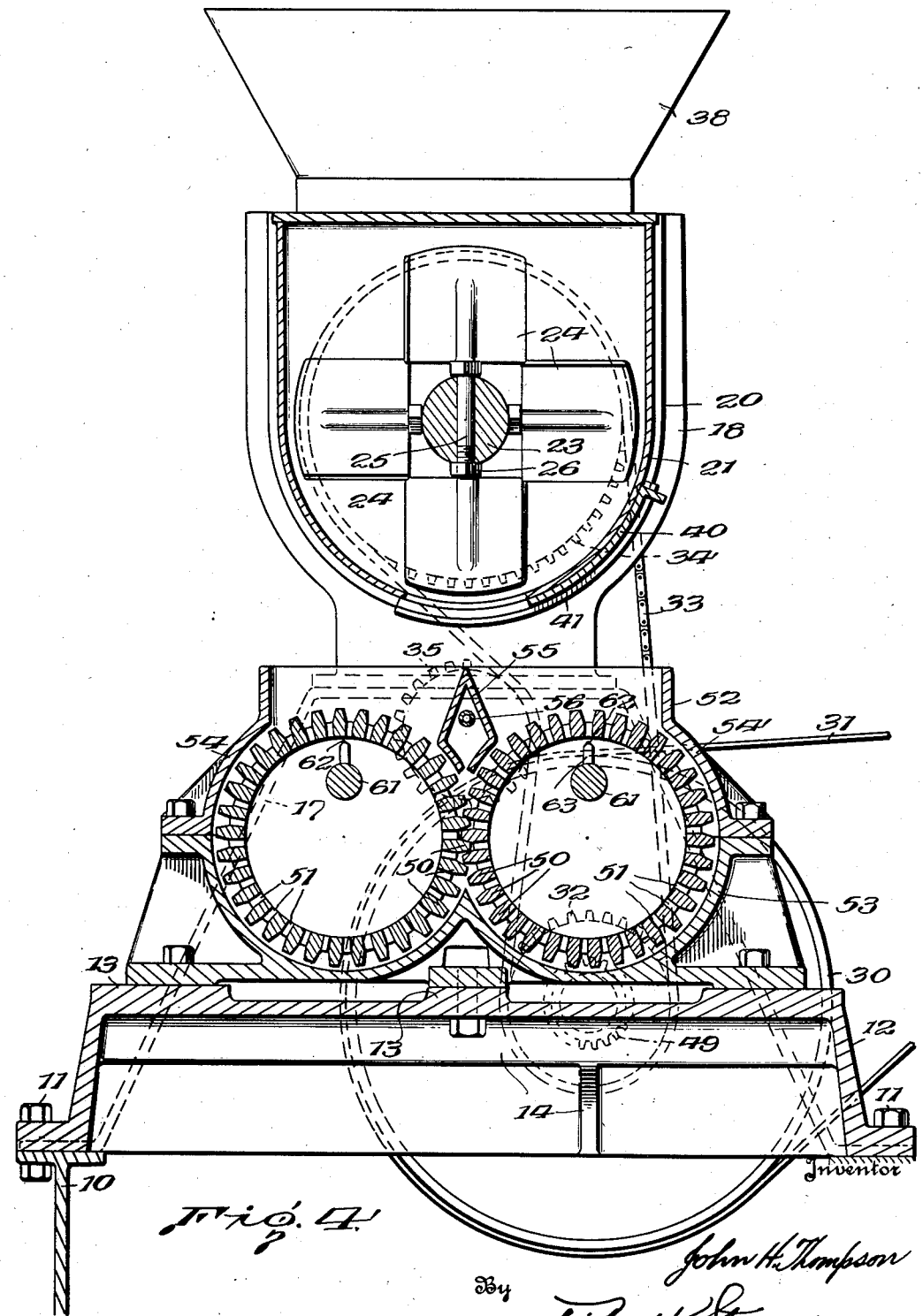

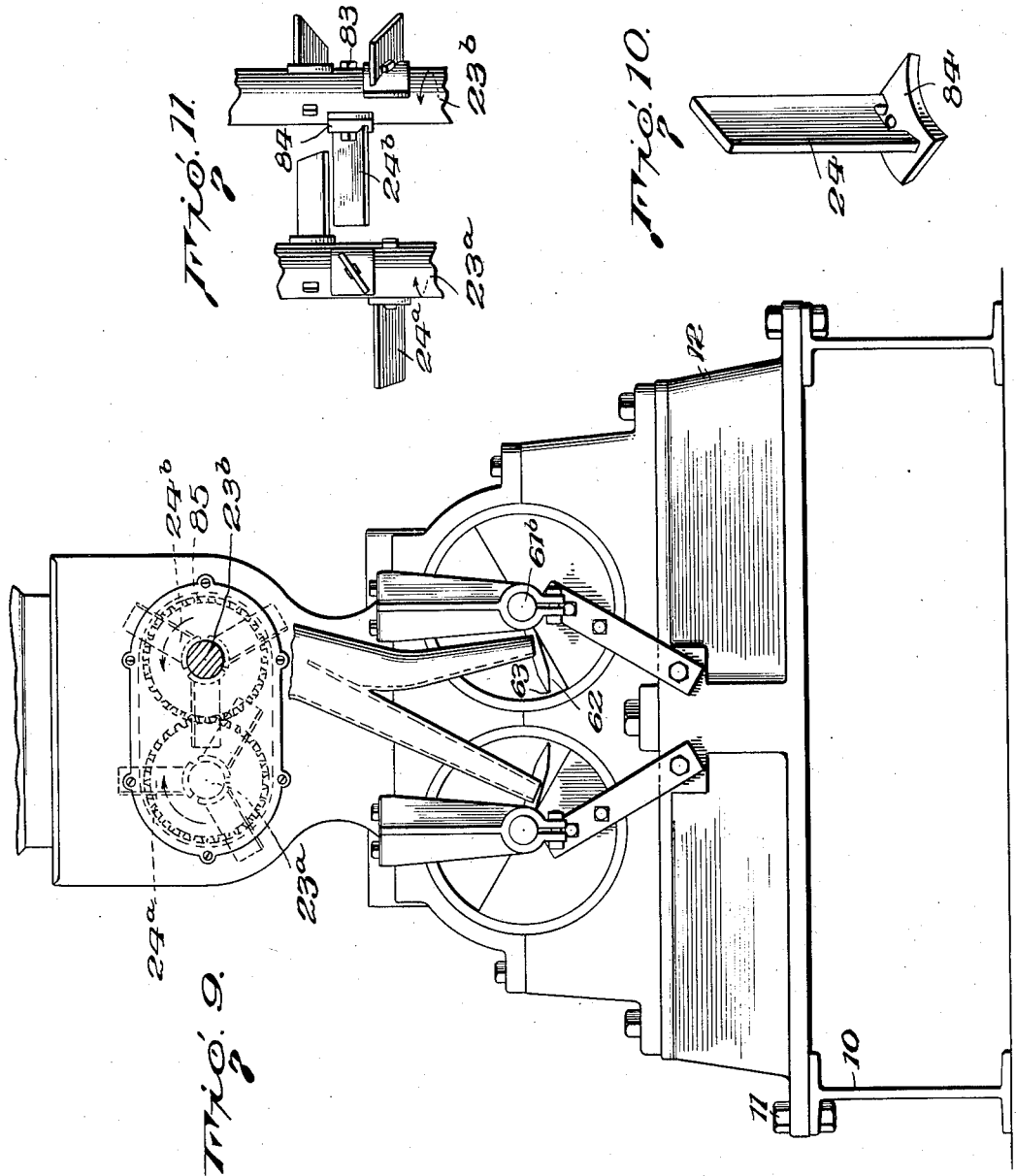

Patented Oct. 16, 1934

1,977,099

UNITED STATES PATENT OFFICE 1,977,099

APPARATUS FOR FORMING NODULES AND THE LIKE

John H. Thompson, Glendale, Calif.

Application December 21, 1931, Serial No. 582,435

9 Claims. (Cl. 25—76)

This invention relates to forming apparatus, and more particularly to a machine for continuously molding pellets or nodules and the like.

For a long period it has been recognized that speed and uniformity in the production of pellets or nodules has been particularly desirable in the medicinal, breakfast food and stock food arts, as well as in the formation of mineral and ceramic articles. Such speed and uniformity in certain of these arts is desired largely because the products are handled in bulk and their uses are such as to require enormous quantities thereof each year.

Probably one of the best known machines used for the purpose of forming articles of the nature in question is the extruding type machine employing a screw feed device to force the material through die plates which have numerous openings therein. In operating the extruding type machine the shreds or bodies extruded through the openings are cut or broken into desired lengths and thereafter collected in bulk. Nevertheless many objections to this type of extruding machine exist and one of these objections is the fact that the capacity of the machine is limited to the size of the die plates capable of being used. Another objection is that an attempt to increase the output of such a machine causes greater compacting of the material and interferes with the proper operation of the cutting mechanism. So far as I am aware no attempt to improve the screw feed type extruding machine by an intermittent operation thereof has been successful in that extreme stresses result from the intermittent starting of the feed screw and because of the die plate being in constant communication with the material being fed, such material continues to be extruded even during the period of rest of the feed screw; and this is particularly true when the machine is attempted to be operated at a high speed.

The present invention is intended to overcome the objections hitherto experienced in the art of forming pellets and nodules and the like, and the invention contemplates the formation of a machine which will continuously produce uniformly sized articles at high speed.

The present invention further contemplates the providing of a rotating die with a cooperating element to effect the forcing or extrusion of the material into the rotary die; the invention further contemplating the formation of an apparatus having a plurality of generally gear shaped rollers each of which has a series of openings in its valleys between adjacent projecting teeth so that a cooperating projecting tooth on a meshing roller will act as a plunger and effect the extrusion of the material previously deposited within the particular valley, whereby the extruded material will be forced into the interior of the respective roller.

A further object of the present invention is the provision of a plurality of large drums arranged parallel within aligned bearings, with the adjacent sections of the drums being provided with staggered series of openings and cooperating plungers so that upon contact between adjacent rollers the plungers on each roller effect the extrusion of material through the particular cooperating openings in the other roller.

It is an additional object of the present invention to provide an extruding apparatus having a mixing chamber, cooperating extruding members, means for delivering a lubricant and/or treating material, and means for further shaping and effecting a discharge of the articles. The invention additionally contemplates the provision of such an apparatus wherein the mechanism is compact and is completely automatic in operation except for the feeding of raw material thereto.

Still another object of the present invention is the provision of a mixing mechanism and an extruding mechanism adapted to be operated in unison, both of which derive their power for operation from a common source.

Figure 2:
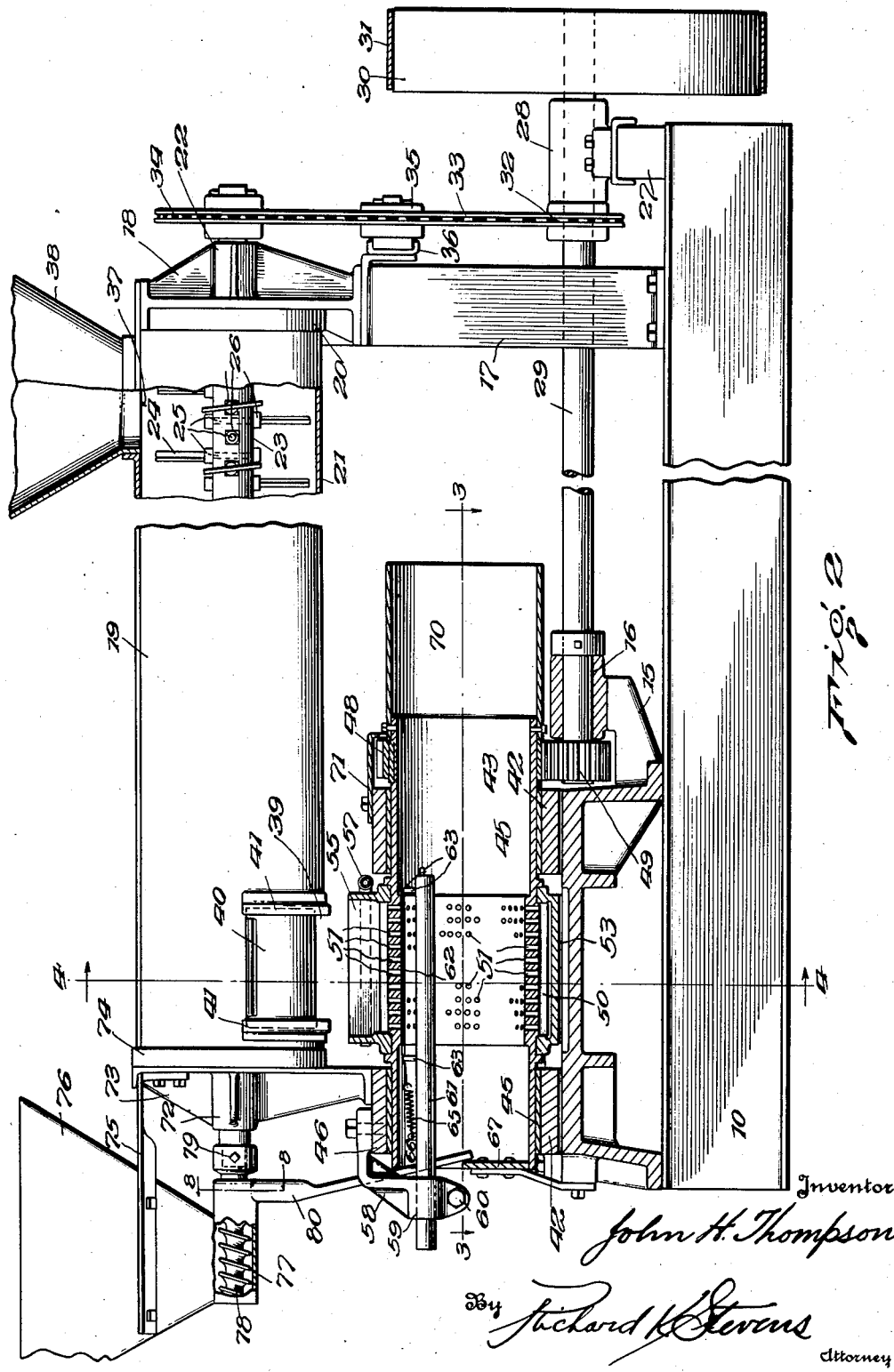

Other objects and advantages will be apparent from the following detailed description and considered in connection with the accompanying drawings wherein:

Fig. 1 is an end view of one form of my invention illustrating the mixing and extruding mechanism with the conditioning material attachment in position, Fig. 2 is a side elevation of the apparatus shown in Fig. 1 partly broken away to illustrate certain of the parts in cross section, Fig. 3 is a horizontal transverse sectional view through the extruding mechanism taken on line 3—3 of Fig. 2, Fig. 4 is a vertical sectional view taken on line 4—4 of Fig. 2, Fig. 5 is an enlarged sectional view through the extruding gears or rollers illustrating the manner of operation, Fig. 6 is a perspective view of one of the cutter mechanisms, Fig. 7 is a transverse sectional view through the cutter mechanism shown in Fig. 6, Fig. 8 is a detailed sectional view through the conditioning material feeding mechanism taken on line 8—8 of Fig. 2, Fig. 9 is an end view of a modified form of Fig. 1, Fig. 10 is a detailed view of one of the paddles shown in the modified form, and Fig. 11 is a view of a section of the shafts showing the paddles thereon.

Now referring to the drawings in detail, the numeral 10 designates I-beams arranged parallel and being adapted to be fastened to the floor or other support upon which the machine is to be placed. Secured to the I-beams 10, as at 11, is a bed plate 12. The bed plate 12 is generally of rectangular formation and is thickened for reinforcement at 13. Reinforcing ribs 14 are arranged on the underside of the bed plate to further strengthen the same. An extending bracket 15 is formed at one end of the bed plate and the bracket is provided with a bearing 16, the purpose of which will be hereinafter more fully described.

The ends of the I-beams opposite to the bed plate 12 are bridged by a bracket 17 which bracket supports at its upper portion a casting 18, the casting being so positioned that it supports one end of a mixing chamber 19. The casting 18 has a flange 20 extending from its side so that the flange engages the cylindrical casing 21 of the mixer 19. A bearing 22 for a shaft 23 is also provided in the casting 18, and this shaft 23 extends through the mixing chamber 19. Within the mixing chamber the shaft carries independently adjustable plates 24, the plates being adjusted to a desired angle and being secured in position by means of independent shafts 25 to which they are fixed. The shafts 25 pass through openings in shaft 23, and the shafts are maintained in position by means of nuts 26 screwed thereon on opposite sides of the shaft 23.

The I-beams 10 are connected at the extreme end adjacent the bracket 17 by a bar 27 having mounted thereon a bearing 28 for receiving a shaft 29, and this shaft 29 has its opposite end journaled in the above mentioned bearing 16. A belt pulley 30 is fixed upon the outer end of the shaft 29 so as to be rotated by means of a belt 31, the belt being adapted to be driven from a suitable source of power (not shown). Inwardly of the bearing 28 on the shaft 29 is a sprocket 32 having a chain 33 passing thereover. The chain 33 also passes over a sprocket 34 carried on the end of the shaft 23 exteriorly of the casting 18. An idling sprocket 35 is mounted for adjustment in a guide 36 which is carried by the bracket 17, so that the idling sprocket may be adjusted tightly against the chain 33 to therefore effect a tightening of the chain.

In its upper portion adjacent to the casting 18, the casing 21 of the mixing chamber 19 is provided with an opening 37. Fitting into the opening is a hopper 38 mounted for support upon the casing in a manner to permit the discharge of material therefrom and into the casing. Near its opposite end the casing 21 is provided with an opening 39, the opening being in the lower portion of the casing and being adapted to be closed by a slide gate 40 which is mounted for movement in guides 41. It will therefore be seen that the operation of the belt pulley 30 through the medium of the belt 31 will cause the rotation of the mixer shaft 23; and that when the plates 24 are positioned, as shown, the anti-clockwise rotation of the shaft will effect a mixing and general propulsion of the material within the chamber 19 in the direction of the opening 39.

The bed plate 12 carries a lower bearing section 42 near each of its ends. These bearing sections 42 are formed to receive tubular rollers or shafts 43 and 44 respectively. Both of the rollers 43 and 44 are provided with bearing surfaces for engagement with the babbit bearings 45 in the lower bearing sections, and bearing cap members 46, which are likewise formed with babbit bearings and shaped to accommodate the adjacent ends of the rollers, fit over the bearing surfaces thereof and are secured to the lower bearing sections by means of bolts 47.

The roller 43 is provided at the inner end thereof beyond its innermost bearing surface, with a spur gear 48 completely surrounding the same and keyed thereto. The spur gear 48 meshes with a pinion 49 carried on the inner end of the shaft 29, and it will be seen that during the rotation of the belt pulley 30 for driving the mixing mechanism, the pinion 49 will cause the rotation of the spur gear 48 with the resultant rotation of the roller 43.

Roller 43 and roller 44 are both provided between the respective bearing surfaces with a series of projections in the form of gear teeth 50. The projections or gear teeth on each of the rollers are so formed and the rollers are so mounted in the bearings that the teeth of one roller fit between the teeth of the other roller during the rotation of the same in the same manner of the teeth gear wheels. Due to this construction the rotation of roller 43 as a result of the operation of the belt pulley 30 as above described will transmit motion to the roller 44 through the medium of the projections 50 so that both rollers travel at the same speed.

Each of the rollers 43 and 44 are provided with a series of openings 51 which are in communication with the valleys between the teeth 50. Openings 51 are spaced as close together as possible consistent with the maintenance of sufficient strength and it is these openings through which the material is extruded in a manner to be hereinafter more fully described.

A hopper element 52 is mounted upon a base 53, and the base is shaped to accommodate the meshing or gear sections of the rollers 43 and 44. Said base 53 is mounted upon the bed plate 12 and is properly aligned so as to support the hopper member with its lower portion closely encircling the gear sections of the rollers as at 54. The hopper member is positioned so as to be directly below the opening 39 in the casing 21 in order that any material discharged through the opening will be deposited within the hopper member.

For diverting the material discharged into the center of the hopper member a shield 55 mounted centrally thereof which may be adjustable up or down and is provided with its walls tapered in the upward direction so that material which contacts with it will be deflected outwardly and over the upper portions of the gear sections of the rollers. Arranged within the shield 55 is a perforated pipe or nozzle 56 through which water or lubricant is adapted to be discharged in a stream or spray for application to the walls of the teeth 50. The water or lubricant is supplied to the pipe 56 from some suitable source (not shown) through the connection 57.

Brackets 58 are mounted upon the outermost bearing cap 46 above the center of each of the rollers 43 and 44 and these brackets are each formed with a contractible section 59 which is adapted to be contracted by a bolt 60. A bar 61 is provided for engagement with each of the contractible sections 59, each section being adapted to be contracted tightly upon an end of one of the bars for holding the same with its opposite end extending into the adjacent roller. Mounted on each of the bars 61 is a cutter formed preferably of a steel wire 62 which is spaced from the bar by being passed over bridges 63. At one end the wire 62 is secured to a pin 64 while at its opposite end it is provided with a coil spring connection which is constructed of a coil spring 65 attached to ear 66 at one end and to the wire 62 at its other end. This wire 62 is held under light tension so that it will vibrate in simple nodes. The vibration will clear the wire of material and furnish a clean cut when the machine is operating at high speeds. This presents an advantage over knife like blades, which quickly accumulate material thereby causing the pellets to be torn rather than cut. The cutter is so positioned by the movement of the bar 61 within the contractible bore 59 that the wire lies closely under the openings 51 of the respective gear sections of the rollers and is adjustable.

Both of the rollers 43 and 44 are partly closed at the lower portions of the outer ends thereof by means of plates 67 which are carried by brackets 68. The brackets are in turn attached to the bed plate 12 by means of bolts 69. These plates 67 fit within the circular bore of the respective rollers and the upper edges thereof are angularly disposed in accordance with the direction of rotation of the rollers. By such a construction any material being tumbled within the rollers will be prevented from passing out of the same by the plates 67 so that the material will be discharged from their other ends. The rollers at the ends opposite to the plates 67 are formed with cylindrical extensions 70 by means of which the material is caused to be tumbled for a longer period while being conveyed for discharge from the respective rollers. A shield 71 is carried by the cap section 46 of the innermost bearings so that the gear 48 is protected from contact with excessive waste material.

At the extreme end where the shaft 23 passes from the mixer chamber 19 it extends through a bearing 72 formed in a casting 73. The casting is mounted upon the cap 46 of the outer bearings and it is provided with a flange 74 for receiving the mixing chamber casing 21 for maintaining the casing in position. Casting 73 has attached thereto brackets 75 upon which is mounted a hopper 76. Arranged at the lower portion of hopper 76 is a housing 77 which accommodates a feed screw 78 in a manner to permit its being readily rotated. The feed screw is attached to the end of the shaft 23 by means of a coupling 79 so that the feed screw will be caused to be rotated with the shaft 23 during the operation of the remainder of the apparatus. Adjacent the innermost end of the housing 77 it is provided with a divided discharge conduit 80, the conduit being so formed with the divided portions 81 and 82 in order that their lower ends of each will extend into a corresponding one of the rollers to points behind the plates 67.

Although the utilization of the gear teeth 50 on the rollers for the purpose of transmitting power from the roller 43 to the roller 44 permits the formation of a somewhat less expensive construction, I have found that it is desirable to employ a spur gear 83 on the roller 44 for meshing with the spur gear 48 on the roller 43. The rollers 43 and 44 may then be caused to rotate at the same speed through the medium of the spur gears 48 and 83 without relying upon the engagement of the teeth 50 for this purpose. When two spur gears are employed, the respective keys by which they are keyed to the rollers should be so arranged that the key on one roller is in direct alignment with the center of one of the projections or teeth 50 while the key on the other roller should be in direct alignment with the center of the valley between the adjacent teeth. This allows adequate clearance between the roller cylinders at all times.

In operating the mechanism, as described, the material is placed in the hopper 38. The moving parts are set in motion by the application of power through the belt 31. The material may be in a dry state or in a more or less plastic state so that it can be thoroughly mixed within the mixing chamber 19 by means of the plates 24. At the same time the plates 24 cause the material being mixed to be propelled towards the opening 39. Different materials may be used depending upon the character of the pellets or nodules to be formed. Among the pellets intended to be produced are those formed from material to produce poultry foods, including pellets comprised largely of mash or meal. Breakfast foods, crackers, cookies, confections, and chewing gum products, as well as clay products may likewise be formed into pellets or nodules by the present apparatus.

The particular material to be extruded is discharged from the mixing chamber 19 through the opening 39 in the amount desired for maintaining the hopper substantially filled. The material settles downwardly toward the space between the adjacent teeth on each of the rollers 43 and 44, and the deflector or shield 55 causes the material to flow or move outwardly into the spaces between the upwardly extending teeth as they are presented during the rotation of the rollers. Previous to the presentation of the teeth beyond the edges of the shield 55, the surfaces of the teeth have had deposited thereon water or lubricant depending upon the nature of the material being treated. The depositing of the water or lubricant results in the surfaces of the teeth permitting the free movement of the material thereover without undue caking. As the rollers are rotated in opposite directions the upper portions thereof are constantly being moved toward the outer edges of the hopper 52. During the movement the material settles within and completely fills the spaces between the teeth. Upon further rotation of the rollers the material is smoothed off above the extreme edges of the teeth by the portions 54 of the hopper member and the material is carried between the teeth until it is engaged by the cooperating teeth of the other roller.

Upon referring particularly to Fig. 5 it will be noted that the teeth on one roller will consecutively bear against the material in the space between the teeth of the opposite roller and that the teeth will extrude a portion of the material through the respective openings 51 so that the extruded material will extend into the interior of the respective roller. Due to the manner of contacting of the teeth a scraping and cleaning action results between the walls thereof and assures the proper meshing of the teeth with the substantially uniform extrusion of the material as the consecutive bodies of material are extruded. As the extruded material in the form suspended from the interior walls of the respective rollers reaches the uppermost position of travel, it is engaged by the cutter within the respective roller and is severed from the material still remaining within the particular series of openings. This material remaining within the openings constitutes appropriate plugs to effect the closing of the openings until the plugs are later extruded on the next revolution. The severed pellets or nodules, when cut or broken away by the cutters, fall to the bottom of the rollers. The rollers are continued to be operated so that the pellets or nodules are continuously formed. It will be seen that the plugs always fill the opening 51 so that the material settling between adjacent teeth, as well as the water or lubricant deposited by the pipe or nozzle 56, is prevented from passing into the interior of the rollers. The utilization of the plugs further results in a uniform quantity of material being deposited between the adjacent teeth during each rotation of the rollers so that the pellets or nodules are always of substantially uniform size.

In the successful design of rotary dies of the character described, a number of principles have to be observed. These principles consist of; the critical ratio between the pitch diameter of the dies, the speed of the revolutions, the size of the teeth, the diameter of the holes and the thickness of the wall. For the most successful operation of my machine I prefer to operate the dies approximately 10 revolutions per minute, per inch of pitch diameter. The ratio between the diameter of the holes and the wall thickness is in the ratio of 3 to 13 and the ratio between the depth of the teeth and the wall is 4 to 13. Whereas I have found by experiment that by using the above mentioned specific ratios the best results can be obtained I do not wish to limit the operation of my machine as these ratios are merely indicative of the preferred range in which the machine can be successfully operated.

In a modified form of my invention I have shown in place of the one shaft 23, in mixing chamber 19, two shafts 23a and 23b to be operated in conjunction. These shafts are provided with plates 24a and 24b. The plates are fastened to the shafts by means of bolts 83 and are further held in rigid position by means of attached plates 84 conforming to the shape of the shafts. The shafts are driven in conjunction by means of suitable gearing 85.

The cutter wires 62 as shown in Fig. 9 are positioned at or near the bottom of the respective gear sections. It is not intended that this position of the cutter wires be confined to the modification but may just as well be applied to the preferred form of the invention.

During the operation of the mixing device and the rollers as a result of the application of power to the shaft 29 through the medium of a belt pulley 30 and a belt 31, as stated, conditioning material may be caused to be fed for contact with the pellets or nodules which have been extruded. Hopper attachment 76 is employed for this purpose and as the rotation of the shaft 23 causes the rotation of the feed screw 78, the conditioning material will thereupon be uniformly and proportionately delivered from the hopper through the divided pipe sections 81 and 82, and into the interior of the rollers. When clay is being formed into pellets, the conditioning material is preferably sand or pure silica, whereby the nodules being tumbled within the rollers will receive a coating of the conditioning material thereon. During the tumbling operation the nodules or pellets become not only coated but they become more spherical in shape, and said nodules or pellets are finally conveyed along the interior of the rollers and discharged through the extensions 70 either upon conveyers or into collecting bins.

In the application of conditioning material to the surface of the pellets or nodules it is possible to uniformly dust chewing gum with substantially uniform quantities of laxatives such as powdered phenolphthalein. It is also possible to apply other coatings to confections or to any other products where the coating material is sufficiently workable to permit its application in this manner. I have found in practice that plastic material of various kinds and in fact any material that is capable of being extruded by the usual screw feed die plate, extruding machines may be formed into pellets, nodules, or cakes, in an apparatus constructed in accordance with this invention.

What I claim is:

1. An apparatus of the character described comprising a pair of oppositely disposed die cylinders each having a wall defining the area of an interior passageway therein, means for feeding a moldable material in a predetermined quantity to said oppositely disposed die cylinders, said die cylinders being provided with a series of projections of substantially the same size, said die cylinders being further provided with a series of openings which are in communication with the valleys between said projections, said projections being adapted to effect a plunger action to discharge material from the respective valleys into which it engages during rotation of the dies to cause bodies of material of substantially uniform length to be extruded so as to extend from the wall of the interior passageway of the respective dies, means for severing the extruded bodies from the remaining portion of the material resting within the opening, and means for coating said extruded bodies.

2. An apparatus of the character described comprising a pair of oppositely disposed die cylinders each having a wall defining the area of an interior passageway therein, means for feeding a moldable material in a predetermined quantity to said oppositely disposed die cylinders, said die cylinders being provided with a series of projections and a series of openings which are in communication with the valleys between said projections, a housing portion for pressing the moldable material into the valleys existing between the projections and for retaining the material therein while it is carried through an arc of not less than 90°, means for extruding the material through said rotating die cylinders by the application of pressure, the diameter of the openings of said die cylinders being in proportion to the depth as 3 is to 13, and adjustable means for severing the extruded streams of material by a vibrating wire and means for removing the severed extruded bodies.

3. An apparatus of the character described comprising a pair of oppositely disposed die cylinders each having a wall defining the area of a substantially uninterrupted interior passageway therein, means for feeding a moldable material in a predetermined quantity to said oppositely disposed die cylinders, said die cylinders being provided with a series of projections of substantially the same size, said die cylinders being further provided with a series of openings which are in communication with the valleys between said projections, said projections being adapted to effect a plunger action to discharge material from the respective valleys into which it engages during rotation of the dies to cause bodies of material of substantially uniform length to be extruded so as to extend from the wall of the interior passageway of the respective dies, means mounted above the co-acting line of the cylinders and effecting a lubrication of said projections by spraying a lubricant thereon, and means for severing the extruded bodies from the remaining portion of the material resting within the opening.

4. An apparatus of the character described comprising a pair of oppositely disposed die cylinders each having a wall defining the area of an interior passageway therein, means for feeding a moldable material in a predetermined quantity to said oppositely disposed die cylinders, said die cylinders being provided with a series of projections of substantially the same size, said die cylinders being further provided with a series of openings which are in communication with the valleys between said projections, said projections being adapted to effect a plunger action to discharge material from the respective valleys into which it engages during rotation of the dies to cause bodies of material of substantially uniform length to be extruded so as to extend from the wall of the interior passageway of the respective dies, means for severing the extruded bodies from the remaining portion of the material resting within the opening, and an adjustable shield interposed between the mixing chamber and the die cylinders in such a manner as to prevent an excess of the material from coming between the projections and openings with respect to their intermeshing action of the oppositely disposed die cylinders.

5. An apparatus of the character described, a mixing chamber having therein a bearing shaft carrying independently adjustable plates, a pair of oppositely disposed rotatable die cylinders each having a wall defining the area of an interior passageway therein, said die cylinders being provided with a series of projections, said die cylinders being further provided with a series of openings which are in communication with valleys between said projections, said die cylinders being further provided with adjustable cutter wires located near the inner periphery, means for simultaneously operating the shaft and plate members located within said mixing chamber and said die cylinders, an opening in said mixing chamber directly above said rotating die cylinders, an adjustable shield interposed between said opening and said die cylinders whereby a predetermined amount of moldable material is continuously fed from said mixing chamber to said die cylinders and subsequently extruded by means of said projections through said openings into the interior of the die cylinders, said cutter wire being adapted to sever the extruded material into the form of pellets whereby a relatively short plug exists within the openings so that additional material delivered into the spaces between the teeth of said cylinders will not fall therethrough, means for simultaneously introducing a coated material into the interior of the die cylinders whereby the extruded bodies are coated, and means for removing the coated extruded bodies.

6. An apparatus of the character described, a mixing chamber having therein a bearing shaft carrying independently adjustable plates, a pair of oppositely disposed rotatable die cylinders each having a wall defining the area of an interior passageway therein, said die cylinders being provided with a series of projections, said die cylinders being further provided with a series of openings which are in communication with valleys between said projections, said die cylinders being further provided with adjustable cutter wires located near the inner periphery, means for simultaneously operating the shaft and plate members located within said mixing chamber and said die cylinders, an opening in said mixing chamber directly above said rotating die cylinders, an adjustable shield interposed between said opening and said die cylinders whereby a predetermined amount of moldable material is continuously fed from said mixing chamber to said die cylinders and subsequently extruded by means of said projections through said openings into the interior of the die cylinders, said cutter wires being adapted to sever the extruded material into the form of pellets whereby a relatively short plug exists within the openings so that additional material delivered into the spaces between the teeth of said cylinders will not fall therethrough, means for simultaneously introducing a coated material into the interior of the die cylinders whereby the extruded bodies are coated, which means includes a feed screw located on the further extremity of said shaft located in the mixing chamber, said feed screw surrounded by a hopper element conduits leading from said hopper element, the lower ends of said conduits extending into each of the respective die cylinders, and means for removing the coated extruded bodies.

7. An apparatus of the character described, a mixing chamber having therein two bearing shafts carrying mixing plates, a pair of oppositely disposed rotatable die cylinders each having a wall defining the area of an interior passageway therein, said die cylinders being provided with a series of projections, said die cylinders being further provided with a series of openings which are in communication with valleys between said projections, said die cylinders being further provided with adjustable cutter wires located near the inner periphery, means for simultaneously operating the shafts and plate members located within said mixing chamber and said die cylinders, an opening in said mixing chamber directly above said rotating die cylinders, an adjustable shield interposed between said opening and said die cylinders whereby a predetermined amount of moldable material is continuously fed from said mixing chamber to said die cylinders and subsequently extruded by means of said projections through said openings into the interior of the die cylinders, said cutter wires being adapted to sever the extruded material into the form of pellets whereby a relatively short plug exists within the openings so that additional material delivered into the spaces between the teeth of said cylinders will not fall therethrough, means for simultaneously introducing a coating material into the interior of the die cylinders whereby the extruded bodies are coated, and means for removing the coated extruded bodies.

8. An apparatus of the character described for forming pellets and the like comprising a pair of oppositely disposed die cylinders and a housing portion therefor, each of the cylinders having a wall defining a passageway therein and each of the cylinders also having a series of projections between which are openings forming communications between the passageway therein and the valleys existing between the projections, said projections being constructed to effect a plunger action for discharging material from the respective valleys into which the projections are passed during rotation of the dies to thereby cause bodies of the material to be extruded and extend from the walls forming the interior passageways of the cylinders, and means for severing the extruded bodies from the remaining portions of the material resting within the openings, the said die cylinders and housing portion being constructed to effect the compression of the material between the housing portion and each of the respective cylinders as the cylinders are rotated with the resultant compacting of the material in the valleys between adjacent teeth before the extrusion thereof from the valleys.

9. An apparatus of the character described for forming pellets and the like comprising a pair of oppositely disposed die cylinders having their upper portions rotating away from each other when the apparatus is in operation, a housing for the cylinders, each of the cylinders having a wall defining a passageway therein and each of the cylinders also having a series of projections between which are openings forming communications between the passageway therein and the valleys existing between the projections, said projections being constructed to effect a plunger action for discharging material from the respective valleys into which the projections are passed during rotation of the dies to thereby cause bodies of the material to be extruded and extend from the walls forming the interior passageways of the cylinders, and means for severing the extruded bodies from the remaining portions of the material resting within the openings, the said housing closely enclosing the die cylinders throughout approximately one-half of the peripheries thereof while the cylinders are accessible from above for delivering the moldable material thereto, the said housing being formed to effect a substantially uniform compression of the moldable material in the valleys as the cylinders are rotated outwardly toward the housing at their upper portions.

JOHN H. THOMPSON.